US009355369B2

(12) United States Patent
Ray et al.

(10) Patent No.: US 9,355,369 B2
(45) Date of Patent: May 31, 2016

(54) DECISION TREE WITH COMPENSATION FOR PREVIOUSLY UNSEEN DATA

(71) Applicant: Wal-Mart Stores, Inc., Bentonville, AR (US)

(72) Inventors: Andrew Benjamin Ray, Bentonville, AR (US); Nathaniel Philip Troutman, Seattle, WA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 229 days.

(21) Appl. No.: 13/874,343

(22) Filed: Apr. 30, 2013

(65) Prior Publication Data
US 2014/0324744 A1    Oct. 30, 2014

(51) Int. Cl.
*G06N 99/00* (2010.01)
*G06F 15/18* (2006.01)

(52) U.S. Cl.
CPC .................................... *G06N 99/005* (2013.01)

(58) Field of Classification Search
None
See application file for complete search history.

(56) References Cited

U.S. PATENT DOCUMENTS

| 5,787,274 | A | 7/1998 | Agrawal | |
|---|---|---|---|---|
| 6,138,115 | A | 10/2000 | Agrawal | |
| 6,718,315 | B1 | 4/2004 | Meek | |
| 7,089,226 | B1 | 8/2006 | Dumais | |
| 2010/0076799 | A1* | 3/2010 | Magent et al. | 705/7 |
| 2012/0278263 | A1* | 11/2012 | Borthwick et al. | 706/12 |
| 2014/0324756 | A1* | 10/2014 | Ray et al. | 706/50 |

OTHER PUBLICATIONS

Quinlan, Unknown Attribute Values in Induction, 1989.*

* cited by examiner

*Primary Examiner* — Stanley K Hill
*Assistant Examiner* — Mikayla Chubb
(74) *Attorney, Agent, or Firm* — Bryan Cave LLP

(57) ABSTRACT

A computer-implemented method is disclosed for efficiently processing records with unseen data. In the method, a computer system may obtain a plurality of records and a decision tree generated in a learning process. The decision tree may include a distinction node having multiple paths extending therefrom. After arriving at the distinction node with one or more records, the computer system may determine that the one or more records correspond to data of a type not seen by the distinction node in the learning process. Thereafter, the computer system may depart the distinction node via each of the multiple paths and eventually reach multiple leaf nodes of the decision tree. Each of the multiple leaf nodes may correspond to a probability distribution. Accordingly, the computer system may combine the probability distribution of each of the multiple leaf nodes to obtain a hybrid probability distribution corresponding to the one or more records.

13 Claims, 5 Drawing Sheets

DECISION TREE WITH COMPENSATION FOR PREVIOUSLY UNSEEN DATA

BACKGROUND

1. Field of the Invention

This invention relates to computerized record processing systems and more particularly to systems and methods for efficiently processing a collection of records through one or more decision trees.

2. Background of the Invention

The computation time required for certain types of record processing increases rapidly as the number of records increases. For example, record linkage requires comparing pairs of records. Each such comparison is computationally expensive. Additionally, as the number records increases, the number of comparisons that need to be conducted grows exponentially. Accordingly, what is needed is a computer system configured to effectively and efficiently process large numbers of records.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
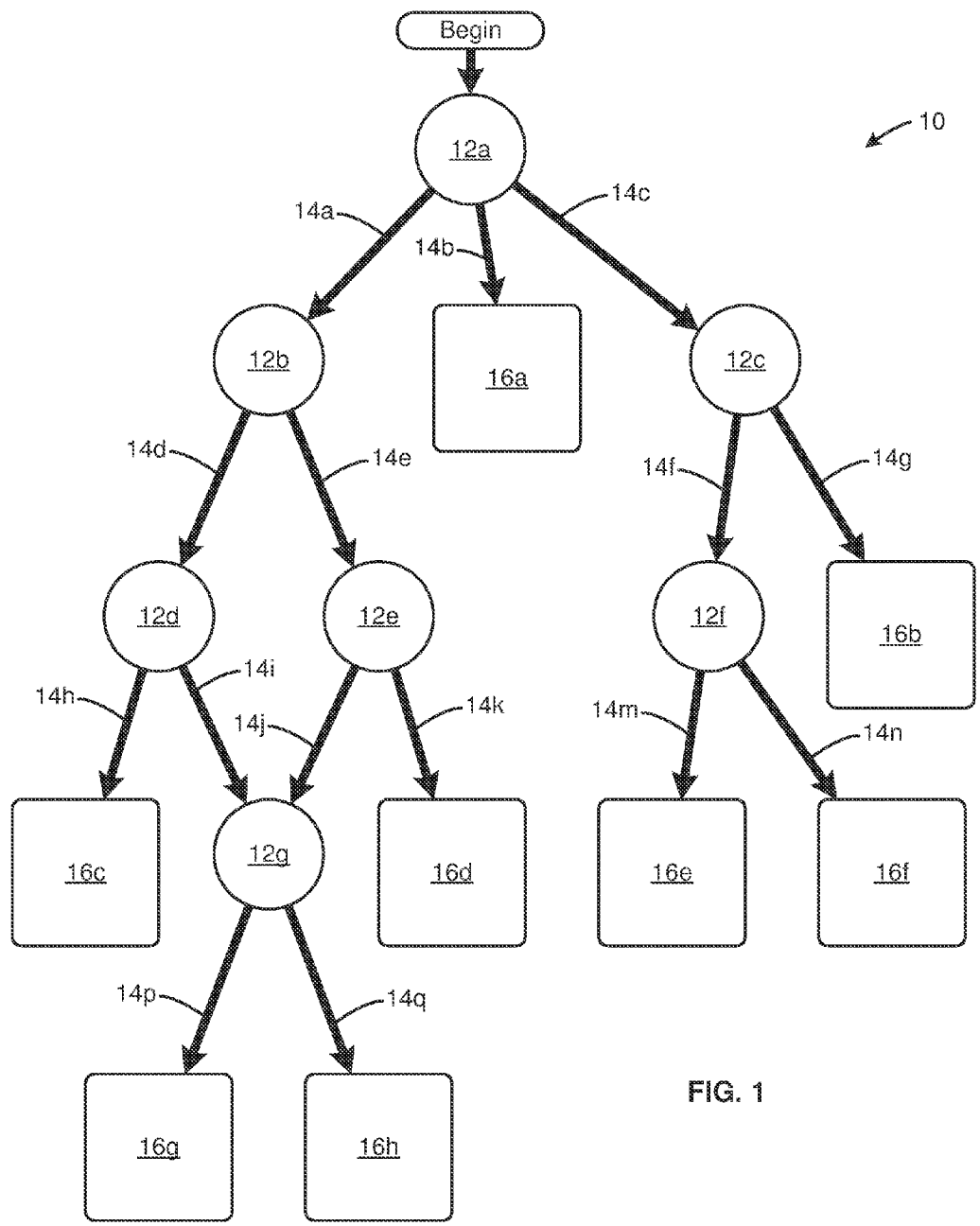
FIG. 1 is a schematic block diagram of one embodiment of a decision tree in accordance with the present invention.

Referring to FIG. 1, record linkage may include determining if two or more records are the same, correspond or refer to the same entity, or the like. When such records are identified, record linkage may further include linking those records together in some manner.

For example, in selected embodiments, a collection of computer records may correspond to a plurality of customers (e.g., each record may comprise a customer profile). Accordingly, a computer system in accordance with the present invention may seek to link together all records within the collection that correspond to the same customer or household. In certain embodiments, a system may accomplish this by comparing various attributes of the records (e.g., customer names, residential addresses, mailing addresses, telephone numbers, email addresses, or the like) using one or more decision trees 10 (e.g., a random forest of probability estimation trees 10).

A decision tree 10 in accordance with the present invention may have any suitable form, composition, or output. In selected embodiments, a decision tree 10 may comprise a probability estimation tree. Rather than generating a simple class membership, a probability estimation tree may yield an estimate of the probability that subject data (e.g., the data being processed through a decision tree 10) is in one or more classes. A random forest may comprise a combination of probability estimation trees, where each tree is grown on a subset of the distinctions and then all the estimates of the trees are combined to return a single class membership Probability Distribution Function (PDF) for the forest. In selected embodiments in accordance with the present invention, the subject data may comprise pairs of records that are being compared for the purpose of record linkage.

A decision tree 10 in accordance with the present invention may comprise multiple distinction or decision nodes 12. Each distinction node 12 may correspond to a distinction that may be applied by a computer system to all subject data passing therethrough. Although only seven distinction nodes 12a-12g are illustrated, a decision tree 10 may include any number of distinction nodes 12.

In operation, a computer system may commence analysis of subject data at a first distinction node 12a. Paths 14 or branches 14 may extend from the first distinction node 12a to other nodes 12b, 12c. Additional paths 14 may in turn extend to yet more distinction nodes 12. It should be noted that, although distinction nodes 12 with two and three paths 14 extending therefrom are illustrated, a distinction node 12 in accordance with the present invention may include any suitable number of paths 14 extending therefrom.

Typically, a distinction node 12 may have only one path 14 extending thereto. For example, only one path 14a, 14c leads to each of the distinction nodes 12b, 12c that immediately follow the first distinction node 12a. However, in selected embodiments, a decision tree 10 may include multiple paths 14 that converge on a particular distinction node 12 (e.g., paths 14i and 14j converge on distinction node 12g). Such a node 12 may be referred to as a "sink node."

Based on the subject data as applied to a distinction (or based on the distinction as applied to the subject data), a computer system may select a particular path 14 from among the multiple paths 14 extending from a corresponding distinction node 12. The subject data may then be directed to (e.g., "arrive" at, "reach") another distinction node 14. In this manner, the subject data may proceed through a decision tree 10. At each distinction node 12, a computer system may learn something new about the subject data.

Eventually, subject data proceeding through a decision tree 10 may be directed to a terminal point. Such terminal points may be referred to as leaf nodes 16. A leaf node 16 may provide or correspond to information that may be used by a computer system to characterize the subject data. For example, based on the particular leaf node 16 reached and/or the particular distinction nodes 12 and paths 14 used to get there, a computer system may be able to generate a PDF for the subject data.

In selected embodiments, a PDF may identify the probabilities corresponding to various characterizations of the subject data. For example, in a record linkage embodiment, the subject data may comprise two records that are being compared to determine whether they correspond to the same person, household, or the like. Accordingly, a PDF may identify (e.g., expressly or inherently) two probabilities. One such probability may characterize the likelihood that the records correspond to the same person, household, or the like. The other such probability may characterize the likelihood that the records do not correspond to the same person, household, or the like.

Figure 2:
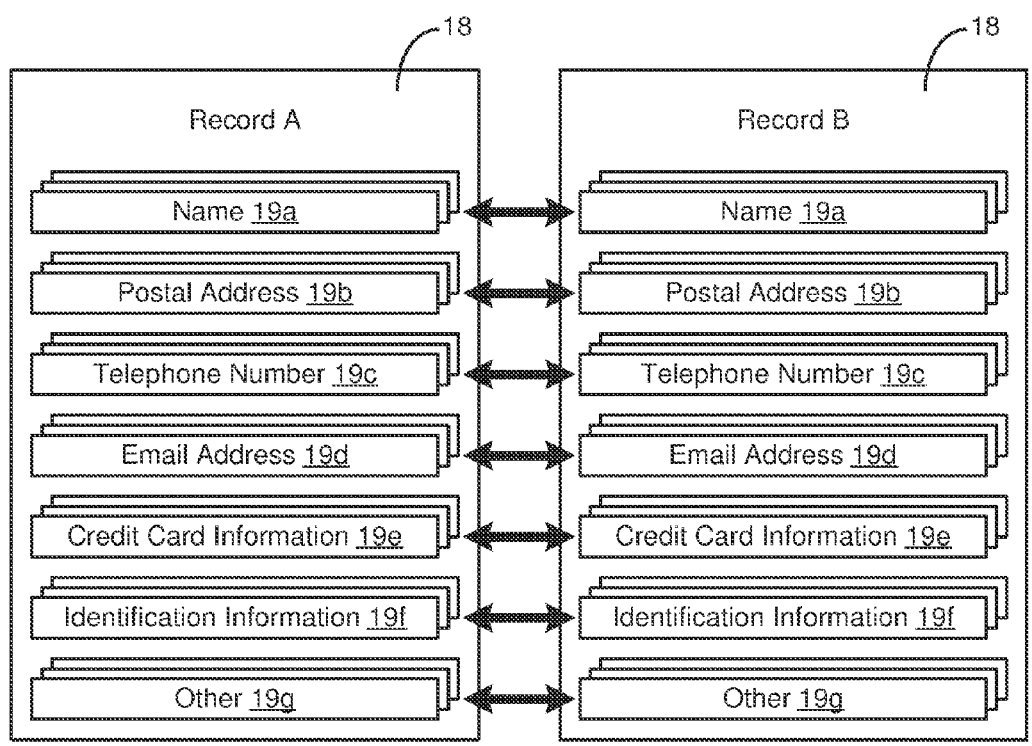
FIG. 2 is a schematic block diagram showing a comparison of two computerized records in accordance with the present invention.

Referring to FIG. 2, computerized records 18 processed in accordance with the present invention may have any suitable form or content. In selected embodiments, records 18 may correspond to the activities of a business, information related to a business, activities of customers of one or more businesses, information related to customers of one or more businesses, or the like or a combination or sub-combination thereof. For example, as noted hereinabove, records 18 may correspond to or comprise customer profiles.

A computerized record 18 may include or contain one or more fields 19, members 19, attributes 19, or the like. The nature of the attributes 19 may correspond to the nature or purpose of a record 18. For example, a record 18 that is embodied as a customer profile may include one or more attributes 19 corresponding to contact information, demographic information, geographic information, and psychographic characteristics, buying patterns, credit-worthiness, purchase history, or the like or a combination or sub-combination thereof. Accordingly, in selected embodiments, a record 18 may include or contain attributes 19 of one or more names 19*a*, postal addresses 19*b*, telephone numbers 19*c*, email addresses 19*d*, credit card information 12*e* (e.g., codes or index information corresponding to credit card data), identification information 19*f* (e.g., account numbers, customer numbers, membership numbers, or the like), other information 19*g* as desired or necessary, or the like.

Records 18 in accordance with the present invention may be processed in any suitable manner. As noted hereinabove, in selected embodiments, it may be desirable to identify one or more links between two or more records 18. Accordingly, an attribute 19 (e.g., telephone number 19*c*) or set of attributes 19 (e.g., set of telephone numbers 19*c*) of one record 18 may be compared to a corresponding attribute 19 or set of attributes 19 of another record 18 to identify those that correspond to the same individual, household, or the like. Such records 10 may then be linked, enabling greater benefit to be obtained thereby.

For example, records 18 corresponding to customer profiles may be generated by different sources. Certain records 18 may correspond to online purchases. Other records 18 may correspond to membership in a warehouse club. Still other records 18 may correspond to purchases in a brick-and-mortar retail store. Selected customers and/or households may correspond to records 18 from one or more such sources. However, there may not be any hard link (e.g., unifying or universal identification number) linking such records 18 together. Accordingly, a decision tree 10 may be used to identify those records 18 that correspond to the same individual, household, or the like. Once linked together, those records 18 may provide a more complete picture of the individual or household and, as a result, be more useful.

Figure 3:
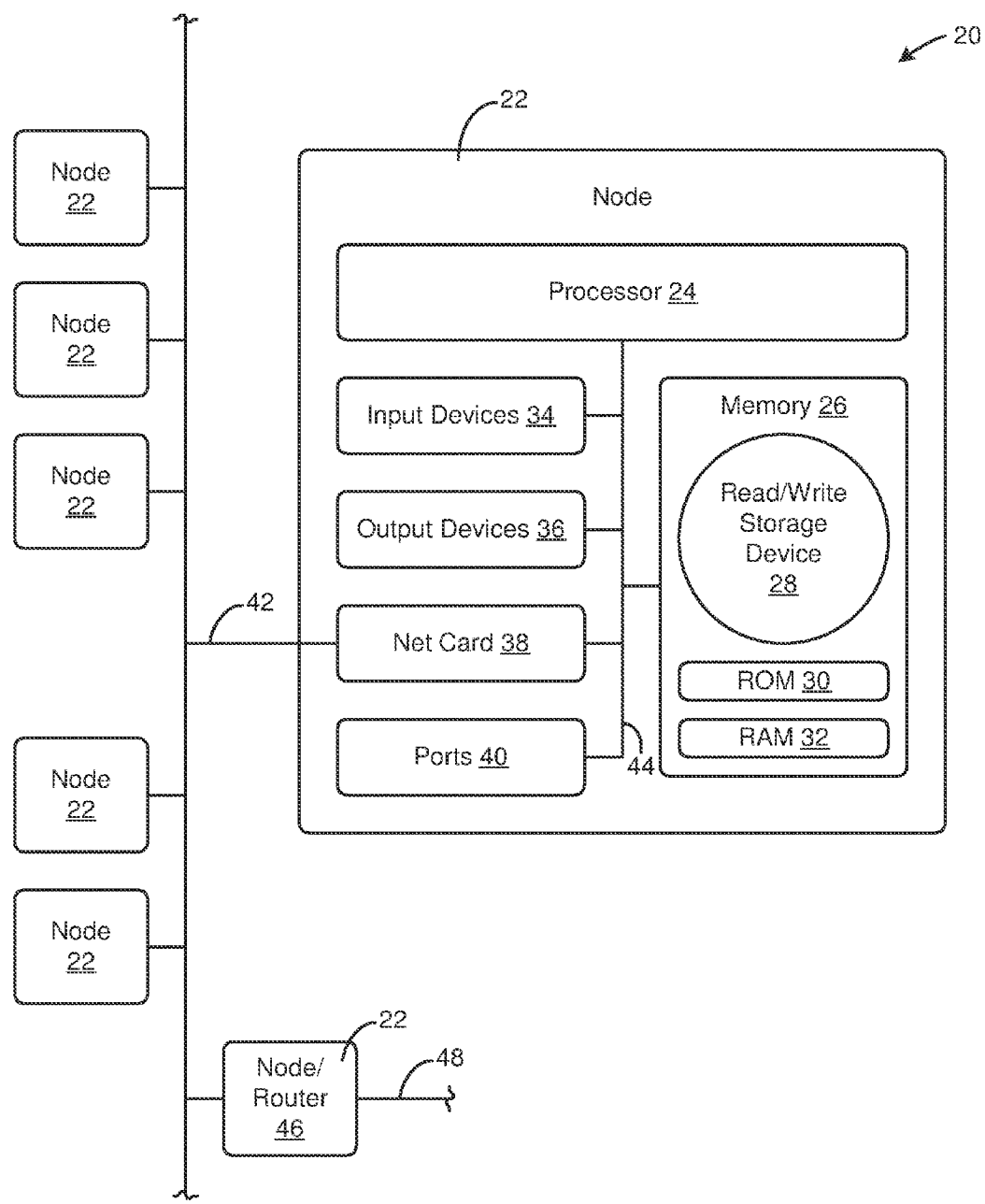
FIG. 3 is a schematic block diagram of one embodiment of a computer system in accordance with the present invention.

Referring to FIG. 3, in selected embodiments, linking two or more records 18 together may require comparing pairs of records 18. As the number records 18 increases, the number of comparisons grows exponentially. Moreover, each comparison of two records 18 may be computationally expensive. Accordingly, computer systems 20 in accordance with the present invention may employ new methodologies in order to efficiently process one or more large collections 14 of records 18 (e.g., collections 14 of over one million records 18, five hundred million records 18, one billion records 18, or the like).

Since comparisons between records 18 are independent (e.g., can be conducted without inter-process communication), record linkage may be performed in a parallel computing environment. Accordingly, in selected embodiments, a computer system 20 in accordance with the present invention may provide, enable, or support parallel computing. In certain embodiments, a system 20 may be embodied as hardware, software, or some combination thereof. For example, a system 20 may include one or more computing nodes 22.

A computing node 22 may include one or more processors 24, processor cores 24, or central processing units (CPUs) 24 (hereinafter "processors 24"). Each such processor 24 may be viewed an independent computing resource capable of performing a processing workload distributed thereto. Alternatively, the one or more processors 24 of a computing node 22 may collectively form a single computing resource. Accordingly, individual workload shares may be distributed to computing nodes 22, to multiple processors 24 of computing nodes 22, or combinations thereof.

In selected embodiments, a computing node 22 may include memory 26. Such memory 26 may be operably connected to a processor 24 and include one or more devices such as a hard drive 28 or other non-volatile storage device 28, read-only memory (ROM) 30, random access memory (RAM) 32, or the like or a combination or sub-combination thereof. In selected embodiments, such components 24, 26, 28, 30, 32 may exist in a single computing node 22. Alternatively, such components 24, 26, 28, 30, 32 may be distributed across multiple computing nodes 22.

In selected embodiments, a computing node 22 may include one or more input devices 34 such as a keyboard, mouse, touch screen, scanner, memory device, communication line, and the like. A computing node 22 may also include one or more output devices 36 such as a monitor, output screen, printer, memory device, and the like. A computing node 22 may include a network card 38, port 40, or the like to facilitate communication through a computer network 42. Internally, one or more busses 44 may operably interconnect various components 24, 26, 34, 36, 38, 40 of a computing node 22 to provide communication therebetween. In certain embodiments, various computing nodes 22 of a system 20 may contain more or less of the components 24, 26, 34, 36, 38, 40, 44 described hereinabove.

Different computing nodes 22 within a system 20 may perform different functions. For example, one or more computing nodes 22 within a system 20 may function as or be master computing nodes 22. Additionally, one or more computing nodes 22 within a system 20 may function as or be worker computing nodes 22. Accordingly, a system 20 may include one or more master computing nodes 22 distributing work to one or more worker computing nodes 22. In selected embodiments, a system 20 may also include one or more computing nodes 22 that function as or are routers 46 and the like. Accordingly, one computer network 42 may be connected to other computer networks 48 via one or more routers 46.

Figure 4:
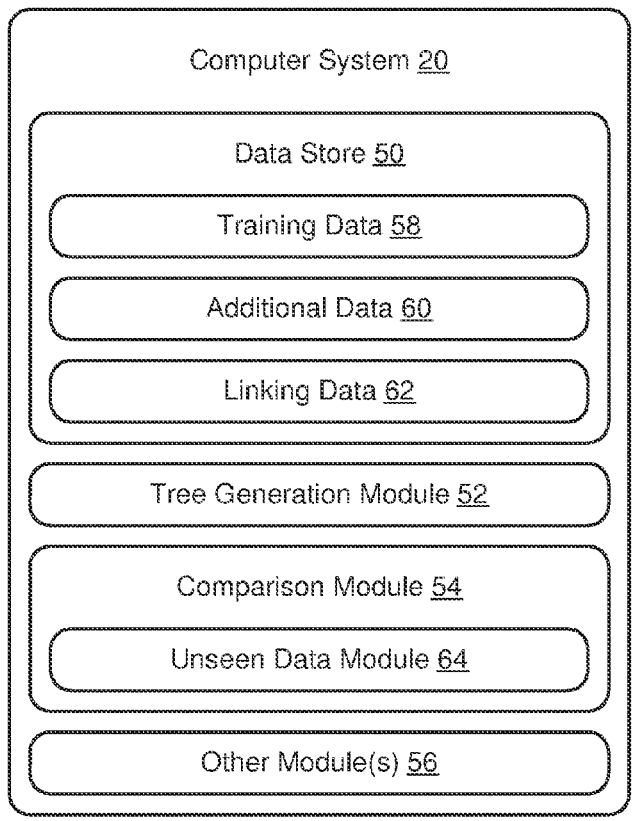
FIG. 4 is a schematic block diagram of various functional modules that may be included within a computer system in accordance with the present invention.

Referring to FIG. 4, a system 20 in accordance with the present invention may process records 18 in any suitable manner. In selected embodiments, the nature of the hardware and/or software of a system 20 may reflect the specific processing to be performed. For example, a system 20 configured to link records 18 may include one or more modules providing, enabling, or supporting such functionality.

A computer system 20 in accordance with the present invention may include any suitable arrangement of modules. In certain embodiments, a computer system 20 may include a data store 50, tree-generation module 52, comparison module 54, one or more other modules 56 as desired or necessary, or the like or a combination or sub-combination thereof.

In selected embodiments, certain components or modules of a computer system 20 may be associated more with computing nodes 22 of a certain type. For example, a data store 50 may be primarily or exclusively associated with one or more master computing nodes 22. Conversely, a comparison module 54 may be primarily or exclusively associated with one or more worker computing nodes 22.

A data store 50 may contain information supporting the operation of a computing system 20. In selected embodiments, a data store 50 may contain or store one or more records 18. For example, a data store 50 may contain one or more records 18 comprising training data 58 (e.g., records 18 used by a tree-generation module 52 in building one or more decision trees 10), one or more records 18 comprising additional data 60 (e.g., records 18 to be processed for record linkage), or the like or combinations thereof. A data store 50 may also contain data, information, results, or the like produced by a computer system 20 or one or more components or modules thereof. For example, a data store 50 may contain linking data 62 identifying which records 18 correspond to the same individual, household, or the like.

A tree-generation module 52 may generate and/or train one or more of the decision trees 10 used by a comparison module 54 to process (e.g., link) records 18. A comparison module 54 may correspond to, enable, or support the processing of one or more records 18 in any suitable manner. In selected embodiments, a comparison module 54 may enable one or more worker computing nodes 22 to compare the records 18 of a particular group amongst themselves using one or more decision trees 10 (e.g., a random forest of probability estimation trees 10) to identify records 18 that correspond to the same individual, household, or the like.

A computer system 20 may correspond to or include multiple comparison modules 54. For example, in a parallel computing environment, a plurality of worker computing nodes 22 may each correspond to, enable, or support a comparison module 54. Accordingly, the number of comparison modules 54 may correspond to or match the number of worker computing nodes 22.

In selected embodiments, a comparison module 54 may include an unseen data module 64. An unseen data module 64 may be programmed to deal with situations where a distinction node 12 is confronted with data that was not seen (e.g., not seen by that distinction node 12) during a learning process.

That is, a decision tree 10 may generated, trained, improved, or the like via a learning process. Such a process may include passing training data 58 (e.g., a collection of records 18 containing certain records known to the linked and others known to be unrelated) through a decision tree 10. In a learning process, distinction nodes 12 may be confronted with various types of data (e.g., attributes 19 of various magnitudes, forms, spellings, or the like) and a computer system 20 may learn how best to handle that data. However, while processing in the real world, a decision tree 10 (e.g., one or more distinction nodes 12 of a decision tree 10) may encounter previously unseen data.

For example, a distinction node 12 that was trained on numeric data may be confronted with a piece of data comprising exclusively letters or a mix of letters and numbers. Similarly, a distinction node 12 that was trained on data that was always present may be confronted with missing data. In such situations, an unseen data module 64 may take over and enable a comparison module 54 to move forward or continue in a meaningful way.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on one or more master computing nodes 22, worker computing nodes 22, or combinations thereof. In selected embodiments, one or more master and/or worker computing nodes 22 may be positioned remotely with respect to one another. Accordingly, such computing nodes 22 may be connected to one another through any type of network, including a local area network (LAN) or a wide area network (WAN), or the connection may be made through the Internet using an Internet Service Provider.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Selected embodiments in accordance with the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 5:
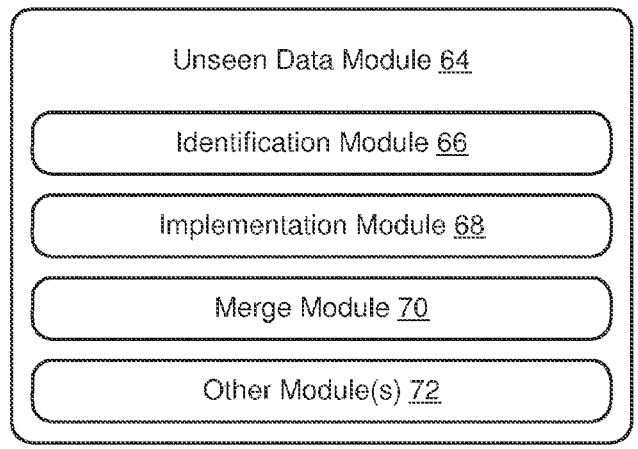
FIG. 5 is a schematic block diagram of one embodiment of an unseen data module in accordance with the present invention.

Referring to FIG. 5, an unseen data module 64 in accordance with the present invention may include any suitable arrangement of sub-components or modules. In selected embodiments, an unseen data module 64 may include an identification module 66, implementation module 68, merge module 70, one or more other modules 72 as desired or necessary, or the like or a combination or sub-combination thereof.

In typical operation, most of the distinctions made in a decision tree 10 may be processed without encountering previously unseen data. However, every so often, a distinction node 12 may be confronted with data of a type, format, size, or the like that was not encountered or seen in a learning or training process. Accordingly, in selected embodiments, an unseen data module 64 may include an identification module 66. An identification module 66 may identify those situations in which an unseen data module 64 needs to be invoked.

An implementation module 68 may implement a desired strategy for dealing with unseen data. For example, in selected embodiments, an implementation module 68 may deal with unseen data by departing a corresponding distinction node 12 via all paths 14 extending therefrom. That is, during a progression through a decision tree 10, one or more records 18 (e.g., a pair of records 18 being compared to one another) may reach a distinction node 12. In selected situations, the data (e.g., attributes 19 of the one or more records 18) needed, utilized, analyzed, or the like by that distinction node 12 may be a type not seen during a learning process. Accordingly, an implementation module 68 may step in and direct the one or more records 18 down all paths 14 extending from the particular distinction node 12.

By passing one or more records 18 down all paths 14 extending from the particular distinction node 12, the one or more records 18 may eventually reach two or more leaf nodes 16. Each such leaf node 16 may correspond to a different probability distribution (e.g., a PDF or the like). Accordingly, in selected embodiments, a merge module 70 may be tasked with combining the two or more probability distributions to obtain a single, hybrid probability distribution or PDF for the one or more records 18.

A merge module 70 may combine multiple probability distributions in any suitable manner. In selected embodiments, a merge module 70 may generate a hybrid probability distribution comprising a weighted combination of the probability distribution of each of the multiple leaf nodes 16 at issue.

The weighting applied by a merge module 70 may be generated in any suitable manner. For example, in selected embodiments, a learning process may result in a certain number of passes through a distinction node 12 at issue. A certain number of those passes may depart via one path 14, a certain number of those passes may depart via another path 14, and so forth. The number of passes through each path 14 may be an indication of the importance of that path 14. Accordingly, the number of passes through the various paths 14 may provide a mechanism for weighing the probability distributions corresponding to those paths 12.

For example, in a record linkage embodiment, a decision tree 10 may include a particular distinction node 12 having only first and second paths 14 extending away therefrom. In a learning processing, 10% of the passes through the distinction node 12 may exit via the first path 14 and 90% of the passes through the distinction node 12 may exit via the second path 14. In a real world application of the decision tree 10, when the distinction node 12 is confronted with unseen data, the corresponding records 18 may be sent down both the first and second paths 14, eventually reaching first and second leaf nodes 16, respectively. Accordingly, a probability distribution corresponding to the first leaf node 16 may receive 10% of the weight, while a probability distribution corresponding to the second leaf node 16 may receive 90% of the weight.

For example, the first leaf node 16 may have a probability distribution of 70% "match" and 30% "no match," while the second leaf node 16 may have a probability distribution of 90% "match" and 10% "no match." Multiplying 70 by 0.10 and 90 by 0.90 and then adding them together may yield a hybrid of 88% match. Similarly, multiplying 30 by 0.10 and 10 by 0.90 and then adding them together may yield a hybrid of 12% no match. Thus, a hybrid probability distribution of 88% match and 12% no match may be a suitable weighted combination based on the distribution of passes through the distinction node 12 at issue.

In selected situations, a single pass through a decision tree 10 or a random forest of decision trees 10 may result in multiple encounters with unseen data. Thus, more than two leaf nodes 16 may eventually be reached. For example, if two distinction nodes 12 are confronted with unseen data, four leaf nodes 16 may potentially be reached. Accordingly, the probability distributions of more than two leaf nodes 16 may be factored into a hybrid probability distribution in accordance with the present invention. This may be accomplished in any suitable manner.

In selected embodiments, the weighting methodology explained above may be applied in such situations with a slight modification as to how the percentage of passes is determined. For example, rather than being based on the number of passes through a particular path 14 divided by the total number of passes reaching the corresponding distinction node 12, the percentage may be based on the number of passes through a particular path 14 divided by the total number of passes that reach any of the distinction nodes 12 confronting unseen data.

Figure 6:
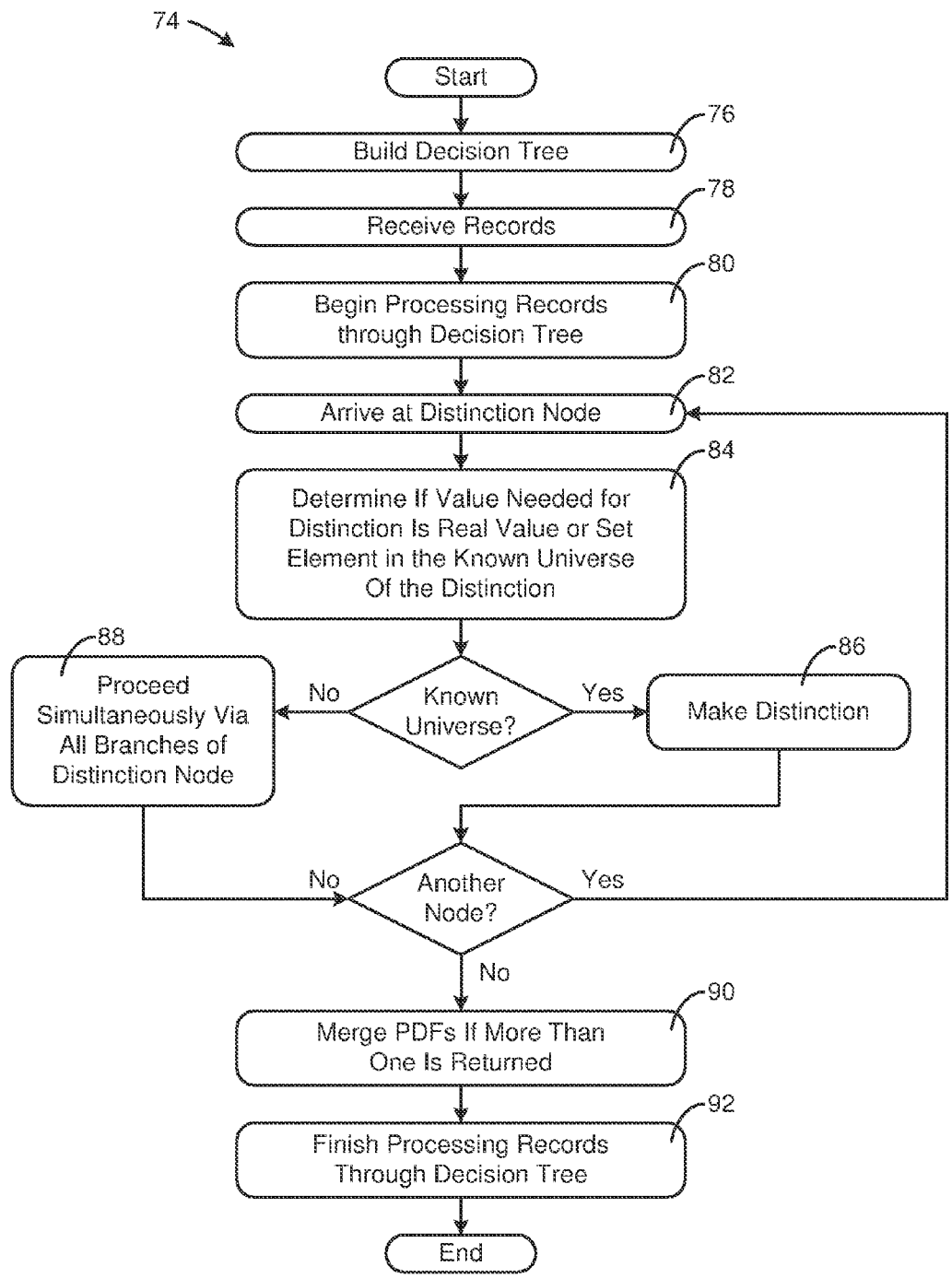
FIG. 6 is a schematic block diagram of one embodiment of a method for compensating for unseen data in accordance with the present invention.

Referring to FIG. 6, in selected embodiments, a method 74 for processing of a collection of computerized records 18 may begin with building 76 one or more decision trees 10 and receiving 78 of a collection of records 18 (or access thereto) by a system 20 in accordance with the present invention. Sometime subsequent thereto, the collection of records 18 may be divided into groups and distributed among a plurality of worker computing nodes 22, where processing the records through a decision tree 10 may begin 80. Accordingly, the number of groups may correspond to the number of worker computing nodes 22 that are to process the records 18.

At some point during the processing of the records 18, subject data (e.g., a pair of records 18 being compared to one another) may arrive 82 at a distinction node 12. Accordingly, a computer system 20 may determine 84 whether every value needed for making a distinction corresponding to the distinction node 12 is a real value, set element, or the like within the known universe of the distinction. That is, a computer system 20 may determine 84 whether any data to be needed, utilized, analyzed, processed, or the like in connection with the distinction node 12 is of a type not seen during a learning process.

If the value, data, or the like is within the known universe of the distinction (e.g., of a type seen during a learning process), the distinction may be made 86. Conversely, if the value, data, or the like is not within the known universe of the distinction (e.g., of a type not seen during a learning process), the computer system (e.g., implementation module 68) may proceed 88 simultaneously via all outgoing paths 14 of the corresponding distinction node 12. This process may be repeated as necessary until all corresponding leaf nodes 16 have been reached. If multiple probability distributions or PDFs have been returned, they may be merged 90 in any suitable manner to form a single probability distribution of PDF for the one or more records being processed in the corresponding pass through the decision tree 10. For example, the resulting probability distributions or PDFs may then be weighted and merged in the manner described hereinabove.

Once an encounter with unseen data is addressed in accordance with the present invention, the processing of one or more other records 18 through a decision tree 10 may continue until it is finished 92 or completed 92. In selected embodiments, continuing through the decision tree 10 may include other encounters with unseen data. Accordingly, selected steps 82, 84, 86, 88, 90 of a method 74 in accordance with the present invention may be repeated.

The flowchart in FIG. 6 illustrates the architecture, functionality, and operation of possible implementations of systems, methods, and computer program products according to certain embodiments of the present invention. In this regard, each block in the flowchart may represent a module, segment, or portion of code, which comprises one or more executable instructions for implementing the specified logical function (s). It will also be noted that each block of the flowchart illustration, and combinations of blocks in the flowchart illustration, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A computer-implemented method for efficiently processing records with unseen data, the method comprising:
   obtaining, by a computer system, a plurality of records;
   obtaining, by the computer system, a decision tree built in a learning process; and
   processing, by the computer system, the plurality of records through the decision tree, the processing comprising:
      arriving at a distinction node of the decision tree with one or more records of the plurality of records, the distinction node having multiple paths extending therefrom;
      determining, by the computer system after the arriving, that the one or more records correspond to data of a type not seen by the distinction node in the learning process;
      departing, by the computer system after the determining, the distinction node via each of the multiple paths;
      reaching, by the computer system after the departing, multiple leaf nodes of the decision tree, each of the multiple leaf nodes corresponding to a probability distribution; and
      combining the probability distribution of each of the multiple leaf nodes to obtain a hybrid probability distribution corresponding to the one or more records,
   wherein:
      the learning process comprises a first number of passes through a first path of the multiple paths and a second number of passes through a second path of the multiple paths;
      the combining comprises combining a probability distribution corresponding to the first path weighted in proportion to the first number and a probability distribution corresponding to the second path weighted in proportion to the second number; and
      the decision tree is a probability estimation tree.

2. The method of claim 1, wherein the decision tree is programmed to perform record linkage.

3. The method of claim 2, wherein each record of the plurality of records comprises a customer profile.

4. The method of claim 3, wherein the decision tree is programmed to identify one or more first records within the plurality of records that are likely to correspond to a common customer or household.

5. The method of claim 4, wherein the data comprises an attribute of a record of the one or more records.

6. The method of claim 4, wherein the data comprises a result of a computation based at least in part on one or more attributes of the one or more records.

7. The method of claim 4, wherein the hybrid probability distribution comprises a weighted combination of the probability distribution of each of the multiple leaf nodes.

8. The method of claim 1, wherein the computer system provides a parallel computing environment.

9. The method of claim 8, wherein the computer system comprises a plurality of worker nodes.

10. The method of claim 9, wherein the processing is conducted by the plurality of worker nodes.

11. A computer-implemented method for efficiently processing records with unseen data, the method comprising:
  obtaining, by a computer system, a plurality of records, each record comprising a customer profile;
  obtaining, by the computer system, a decision tree created in a learning process; and
  processing, by the computer system, the plurality of records through the decision tree, the processing comprising:
    arriving at a distinction node of the decision tree with one or more records of the plurality of records, the distinction node having multiple paths extending therefrom;
    determining, by the computer system after the arriving, that the one or more records correspond to data of a type not seen by the distinction node in the learning process;
    departing, by the computer system after the determining, the distinction node via each of the multiple paths;
    reaching, by the computer system after the departing, multiple leaf nodes of the decision tree, each of the multiple leaf nodes corresponding to a probability distribution; and
    combining, by the computer system, the probability distribution of each of the multiple leaf nodes to obtain a hybrid probability distribution corresponding to the one or more records, and
  wherein:
    the decision tree is a probability estimation tree;
    the learning process comprises a first number of passes through a first path of the multiple paths and a second number of passes through a second path of the multiple paths; and
    the combining comprises combining a probability distribution corresponding to the first path weighted in proportion to the first number and a probability distribution corresponding to the second path weighted in proportion to the second number.

12. A computer system comprising:
  a plurality of processors;
  one or more memory devices operably connected to one or more processors of the plurality of processors, the one or more memory devices collectively storing a plurality of records; and
  a plurality of comparison modules, each programmed to process records of the plurality of records through a decision tree comprising a distinction node, the distinction node having multiple paths extending therefrom, the plurality of comparison modules each being further programmed to depart the distinction node via all of the multiple paths when the distinction node is confronted with data of a type not seen by the distinction node in the learning process, and the plurality of comparison modules each being further programmed to combine probability distributions from each of multiple leaf nodes reached via the multiple paths to obtain a hybrid probability distribution for one or more records of the plurality of records corresponding to the data, and
  wherein:
    the decision tree is a probability estimation tree;
    the learning process comprises a first number of passes through a first path of the multiple paths and a second number of passes through a second path of the multiple paths; and
    the plurality of comparison modules each being further programmed to combine comprises the plurality of comparison modules each being further programmed to combine a probability distribution corresponding to the first path weighted in proportion to the first number and a probability distribution corresponding to the second path weighted in proportion to the second number.

13. The method Of claim 1, wherein:
  the decision tree is programmed to perform record linkage;
  each record of the plurality of records comprises a customer profile;
  the decision tree is programmed to identify one or more records within the plurality of records that are likely to correspond to a common customer or household; and
  the computer system provides a parallel computing environment.

* * * * *